Patented July 11, 1933

1,917,285

UNITED STATES PATENT OFFICE

ROGER ADAMS, OF URBANA, ILLINOIS, EARL HANFORD JOHNSON, OF GREEN BAY, AND VIKTOR M. WEINMAYR, OF MILWAUKEE, WISCONSIN, ASSIGNORS TO E. I. DU PONT DE NEMOURS & COMPANY, OF WILMINGTON, DELAWARE, A CORPORATION OF DELAWARE

HALOGEN DERIVATIVE OF α-NAPHTHOYL-O-BENZOIC ACID

No Drawing. Application filed March 16, 1932. Serial No. 599,336.

This invention relates to novel intermediates for dyestuffs. More particularly, this invention deals with novel halogen derivatives of alpha-naphthoyl-o-benzoic acid.

By alpha-naphthoyl-o-benzoic acid we are referring to the compound represented by the formula:

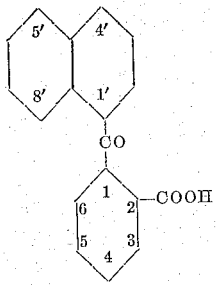

It may also be designated as 1'-naphthoyl-2-benzoic acid. This compound and some of its derivatives are useful for the preparation of the corresponding derivatives of 1, 2-benzanthraquinone. Certain halogen derivatives of this compound have been known in the art, and have been prepared generally by condensing a halogenated naphthalene body with phthalic anhydride or halogenated phthalic anhydride with naphthalene.

We have now found that halogenated alpha-naphthoyl-o-benzoic acid may be produced by direct halogenation of alpha-naphthoyl-o-benzoic acid. Moreover, the products appear to be novel and different from any of the known halogen derivatives of this compound. Further study and research convinced us that the halogen enters into the alpha positions of the naphthalene ring, and depending on the degree of halogenation, will displace the hydrogen in the 5'-position only or in the 5'- and 8'-positions.

It is accordingly an object of this invention to provide a process for preparing novel halogen derivatives of alpha-naphthoyl-o-benzoic acid, having the general formula:

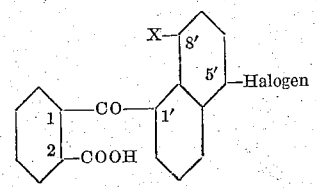

wherein X stands for hydrogen or halogen.

Other important objects of this invention will appear as the description proceeds.

Our preferred method of halogenation comprises dissolving alpha-naphthoyl-o-benzoic acid in acetic acid and passing in chlorine or bromine until one or two molecular weights of halogen have been consumed, depending on whether the monohalogen or di-halogen compound is desired. The dihalogen compound may also be prepared by starting with the corresponding monohalogen compound and subjecting to halogenation as above. Other solvents or other halogenating agents may be used. If sulfuric acid is used as solvent, the reaction proceeds rapidly toward the production of the dihalogen compound, without stopping at the intermediate monohalogen stage.

Without limiting our invention to any particular procedure, the following examples will serve to illustrate our preferred mode of operation. Parts given are parts by weight.

*Example 1.—5'-bromo-1-naphthoyl-2-benzoic acid*

To 100 parts of alpha-naphthoyl-o-benzoic acid in a flask fitted with a reflux condenser, are added 100 parts of glacial acetic acid and 70 parts of bromine, and the mixture is refluxed for 4 hours. The reaction mixture is then cooled in an ice-salt bath until it has all solidified. On warming the flask to room temperature a precipitate of 5-bromo-alpha-naphthoyl-o-benzoic acid forms. This is filtered off and dried. The compound is purified by repeated recrystallization from toluene and has a melting point of 203–204° C. Analysis shows it to be a mono-bromo derivative of alpha-naphthoyl-o-benzoic acid. By fusion with caustic alkali at 200° C., it yields 5-hydroxy-1-naphthoic acid. When ring-closed with concentrated sulfuric acid in the optional presence of boric acid, it yields a Bz-monobromo-benzanthraquinone of melting point, 231–232° C.

The brominated compound is therefore 5'-bromo-1'-naphthoyl-2-benzoic acid of the formula:

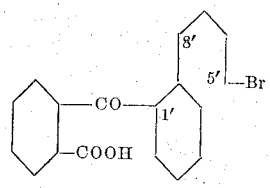

Example 2.—5',8'-dibromo-1'-naphthoyl-2-benzoic acid 5 parts of purified alpha-naphthoyl-o-benzoic acid are ground with a trace of ferric chloride and a trace of iron powder and placed in a suitable vessel. 16 parts of bromine are allowed to drop slowly onto this mixture. After the bromine is all added, the reaction mixture is allowed to stand for 3–4 hours at room temperature and is then treated with dilute sodium hydroxide solution, whereupon all of the product dissolves in the boiling solution, leaving a residue of ferric hydroxide. This is filtered off, and on cooling, a small amount of the sodium salt precipitates. The solution is acidified with dilute hydrochloric acid, and a white precipitate is produced. The compound is purified by crystallization from toluene. It forms fine white needles of melting point 260–261° C. It analyzes 2 bromine atoms per molecule. When ring closed with concentrated sulfuric acid in the optional presence of boric acid, it yields a dibromo-benzanthraquinone which is a bright yellow solid and melts at 265–266° C.

The bromination compound is therefore most probably 5',8'-dibromo-1'-naphthoyl-2-benzoic acid of the formula:

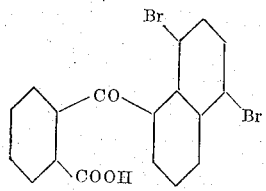

Example 3.—5',8'-dibromo-1'-naphthoyl-2-benzoic acid 276 parts of alpha-naphthoyl-o-benzoic acid are dissolved in 1370 parts of 93% sulfuric acid at 50° C. 160 parts of bromine are added slowly at this temperature, which is maintained further for 22 hours. The temperature is then raised slowly to 70° C. to complete the reaction. The mass is now poured into 4000 parts of ice water and the yellow precipitate is filtered and washed. The cake is extracted with dilute caustic soda to separate it from a considerable amount of ring-closed product, and the clear solution is run into ice and acid. This product, when recrystallized from glacial acetic acid gives a constant melting point of 260–261° C., and is identical with the product of Example 2.

Example 4.—5'-chloro-1'-naphthoyl-2-benzoic acid 414 parts of alpha-naphthoyl-o-benzoic acid are dissolved in 500 parts of glacial acetic acid and treated at 114–118° C. with chlorine gas until it increases in weight by about 53 parts. The red solution is poured onto 500 parts of ice and water and the precipitate is filtered, washed and dried. Yield=440 parts, which is equal to 94.4% of theory. By repeated recrystallization from toluene a pure 5'-chloro-1'-naphthoyl-o-benzoic acid is obtained with a melting point of 179–180° C. When ring-closed with concentrated sulfuric acid in the optional presence of boric acid, it gives a Bz-chloro-benzanthraquinone compound, melting at about 232° C.

Example 5.—5',8'-dichloro-1'-naphthoyl-2-benzoic acid 276 parts of alpha-naphthoyl-o-benzoic acid are dissolved in 1370 parts of 93% sulfuric acid and chlorine is fed in at 30–40° C. to a final increase in weight of 87 parts. The solution is then diluted with ice and water, filtered and washed. The cake is extracted with hot, dilute caustic soda, leaving a residue of about 92 parts, consisting of a mixture of benzanthraquinone and chlorinated benzanthraquinone. The alkaline extracting liquor, containing the soluble material, is run into acid, and the precipitate formed is filtered and washed. When recrystallized from acetic acid, pure 5',8'-dichloro-1'-naphthoyl-2-benzoic acid is obtained, with a melting point of 242° C. This compound, when ring-closed with sulfuric acid in the presence of boric acid gives a mixture of two dichloro-benzanthraquinones, one of which melts at 237–238° C., and the other at 304° C. The two may be separated by fractional crystallization from an organic solvent, such as chlorobenzene, or by extracting the low melting component with toluene and crystallizing the other component from nitrobenzene.

It will be understood that many variations and modifications are possible in the above procedures without departing from the spirit of this invention.

In the above examples, the product was isolated as free acid. By neutralization, for instance with caustic soda, the corresponding salts, such as the sodium salt, may be readily obtained. It should be understood, therefore, that in our claims below we consider the salts of our novel compounds as equivalents of the free acid.

We claim:

1. A process for producing a halogenated derivative of alpha-naphthoyl-o-benzoic acid having the general formula:

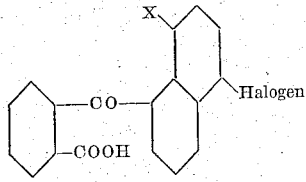

wherein X stands for H or halogen, which comprises reacting with halogen upon alpha-naphthoyl-o-benzoic acid.

2. A process for producing a halogenated derivative of alpha-naphthoyl-o-benzoic acid which comprises reacting with halogen upon alpha-naphthoyl-o-benzoic acid in acid medium.

3. A process for producing 5',8'-dihalogen-1'-naphthoyl-2-benzoic acid which comprises reacting with halogen upon alpha-naphthoyl-o-benzoic acid dissolved in sulfuric acid.

4. A halogenation derivative of alpha-naphthoyl-o-benzoic acid possessing the following general formula:

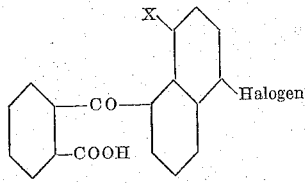

wherein X stands for H or halogen.

5. 5',8'-dihalogen-1'-naphthoyl-2-benzoic acid.

6. 5'-halogen-1'-naphthoyl-2-benzoic acid.

7. A bromination derivative of alpha-naphthoyl-o-benzoic acid possessing the following general formula:

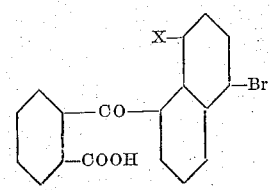

wherein X stands for H or Br.

8. 5'-bromo-1'-naphthoyl-2-benzoic acid.

9. A chlorination derivative of alpha-naphthoyl-o-benzoic acid possessing the following general formula:

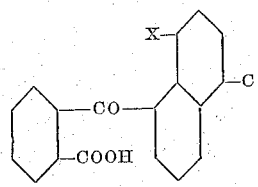

wherein X stands for H or Cl.

10. 5',8'-dichloro-1'-naphthoyl-2-benzoic acid.

11. 5'-chloro-1'-naphthoyl-2-benzoic acid.

In testimony whereof we affix our signatures.

ROGER ADAMS.
EARL HANFORD JOHNSON.
VIKTOR M. WEINMAYR.